US012572132B2

(12) United States Patent
Alhumaid

(10) Patent No.: US 12,572,132 B2
(45) Date of Patent: Mar. 10, 2026

(54) AUTONOMOUS REVIVAL OF PDHMS DOWNHOLE GAUGES TOOL

(71) Applicant: SAUDI ARABIAN OIL COMPANY, Dhahran (SA)

(72) Inventor: Saleh Alhumaid, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 514 days.

(21) Appl. No.: 18/168,730

(22) Filed: Feb. 14, 2023

(65) Prior Publication Data

US 2024/0272617 A1 Aug. 15, 2024

(51) Int. Cl.
*G05B 19/4155* (2006.01)

(52) U.S. Cl.
CPC .................... *G05B 19/4155* (2013.01); *G05B 2219/45129* (2013.01)

(58) Field of Classification Search
CPC ................. G05B 2219/45129; G05B 19/4155
See application file for complete search history.

(56) References Cited

U.S. PATENT DOCUMENTS 8,312,320 B2    11/2012   Almadi
9,429,678 B2    8/2016    Abitrabi et al.

| | | | |
|---|---|---|---|
| 2007/0266725 A1* | 11/2007 | Anikhindi | A61L 9/16 62/317 |
| 2009/0021393 A1* | 1/2009 | Layton | G01V 11/002 340/854.9 |
| 2012/0037354 A1* | 2/2012 | McCoy | F04D 13/10 166/65.1 |
| 2012/0192623 A1* | 8/2012 | Adami | G01N 33/007 73/31.05 |
| 2017/0150554 A1* | 5/2017 | Shoup | H05B 6/6423 |
| 2023/0212942 A1* | 7/2023 | Stenio Pereira Morais | F16B 7/182 340/853.2 |

FOREIGN PATENT DOCUMENTS

WO    WO-2017014734 A1 *    1/2017    ............ G01R 31/50

* cited by examiner

*Primary Examiner* — Vincent H Tran
(74) *Attorney, Agent, or Firm* — Vorys, Sater, Seymour and Pease LLP

(57) ABSTRACT

In certain embodiments, permanent downhole measuring system (PDHMS) includes a sensor having one or more gauges each operable to provide measurement data indicative of a physical parameter, and a field control unit operable to receive the measurement data from the one or more gauges. The field control unit includes a current source configured to provide current to at least one gauge of the sensor and to apply a correction regime that changes the amount of current provided to the at least one gauge upon unplanned cessation of the receipt of the measurement data from the at least one gauge.

15 Claims, 2 Drawing Sheets

AUTONOMOUS REVIVAL OF PDHMS DOWNHOLE GAUGES TOOL

FIELD OF THE DISCLOSURE

The present disclosure relates generally to oil and gas production operations, and more particularly, to autonomous revival of permanent downhole measuring systems (PDHMS) used in such operations.

BACKGROUND OF THE DISCLOSURE

Permanent downhole measuring systems (PDHMS) are used in oil and gas production operations to provide important well data to the surface. Examples of such data include, but are not limited to, temperature and pressure, which are useful for calculating many important parameters including for instance the well's productivity index, remaining reserves, dynamic fluid behavior regime, skin factor and formation damage skin, bottom hole flowing and static pressure, metal erosion rate (in perforated completion wells), and bottom hole corrosion rate.

Due to the harsh conditions within the well, the valuable instruments providing the well data are subject to malfunction, and their remoteness deep within a well may make repair or replacement prohibitively difficult or expensive. Often data transmission may be suspended for prolonged periods, while third party expert technicians have to be enlisted to conduct the repair or replacement.

It would be an improvement to the state of the art of PDHMS if these instruments could be diagnosed and/or repaired in situ, without the need for additional expert personnel, and without having to take them offline for a prolonged period of time.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, In certain embodiments, permanent downhole measuring system (PDHMS) includes a sensor having one or more gauges each operable to provide measurement data indicative of a physical parameter, and a field control unit operable to receive the measurement data from the one or more gauges. The field control unit includes a current source configured to provide current to at least one gauge of the sensor and to apply a correction regime that changes the amount of current provided to the at least one gauge upon unplanned cessation of the receipt of the measurement data from the at least one gauge.

In another embodiment, a method for operating a PDHMS includes supplying current from a current source disposed in a field control unit to a gauge of a sensor deployed in a wellbore, receiving at the field control unit measurement data from the gauge indicative of a physical parameter in the wellbore, detecting an unplanned cessation of receipt of measurement data from the gauge, and applying a correction regime to the current source upon detecting said unplanned cessation. In certain embodiments, the correction regime includes, if the current is below a threshold, incrementally increasing the current, if the current has been increased by more than a maximum value, and receipt of the measurement data has resumed, reducing the current by a reduction value.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 2:
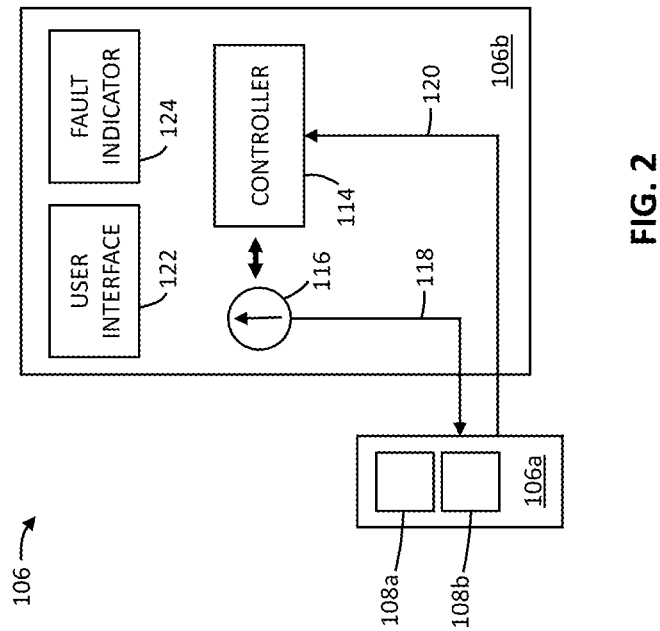
FIG. 2 is a block diagram of a PDHMS in accordance with certain embodiments.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to oil and gas drilling operations, and more particularly, to maintenance of permanent downhole measuring systems (PDHMS) used in such operations.

Figure 1:
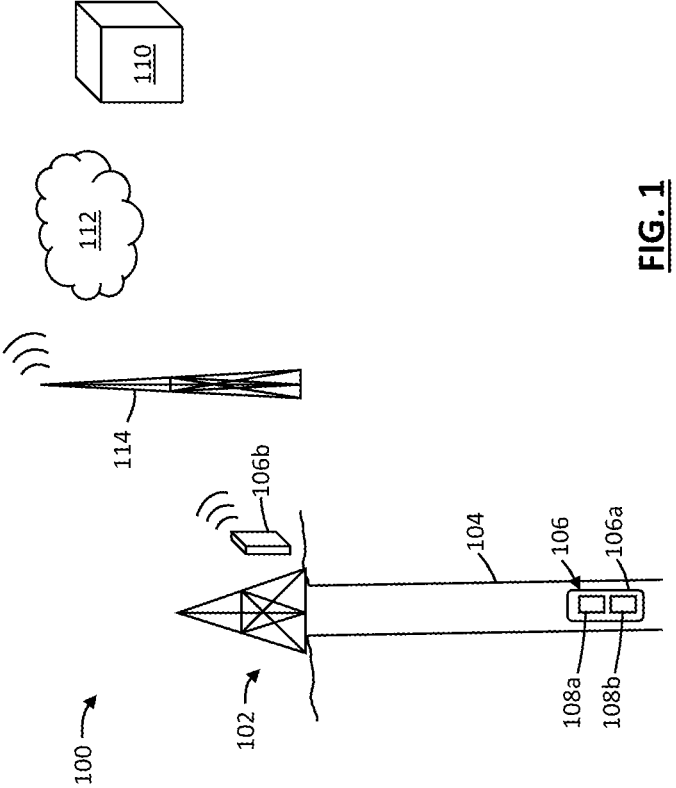
FIG. 1 is a schematic diagram of a system for conducting oil and gas drilling operations including a PDHMS in accordance with certain embodiment.

FIG. 1 is a schematic diagram of a system 100 for conducting oil and gas drilling operations. The system 100 includes one or more wells 102 each having a wellbore 104 in which a permanent downhole measuring system (PDHMS) 106 is disposed. The wellbore 104 may be cased, open hole, contain tubing, and/or may generally be characterized as a hole in the ground having a variety of shapes and/or geometries as are known to those of skill in the art. While the system 100 is depicted in FIG. 1 as a land-based system, the principles described herein may be equally applicable to subsea operations that employ floating or sea-based platforms and rigs, without departing from the scope of the disclosure.

PDHMS 106 comprises two main components: the downhole sensor 106*a*, and the field control unit 106*b*. These two components are in communication with one another, such that data measurements and other signals, for example from gauges 108*a* and 108*b* in the downhole sensor 106*a*, are conveyed to field control unit 106*b*, and control and power and other signals are conveyed from the field control unit 106*b* to the downhole sensor 106*a*. The signal exchange, it will be appreciated, is thus bidirectional, and may be wired and/or at least partially wireless.

In certain embodiments, system 100 includes a central control unit 110 with which each PDHMS 106 of each of the potentially multiple wells 102 is in communication. A communication network represented by a cloud 112 and towers 114 may be deployed for this purpose, and may include one or more wired or wireless channels (not shown) that serve to transmit and route the conveyed information, also bidirectionally, between each PDHMS 106 and the central control unit 110.

FIG. 2 is a block diagram of a PDHMS 106 in accordance with certain embodiments. Generally, a controller 114 housed in field control unit 106*b* is configured to control some aspects of the operation of the PDHMS 106. A current source 116 provides current to run the gauges 108*a,b* in sensor 106*a*, for example by way of cable 118 extending between sensor 106*a* and field control unit 106*b*. Gauges 108*a,b* may be temperature or pressure gauges, for example, and while only two such gauges are shown, it should be understood that more or less than two are contemplated, and physical parameters other than temperature and pressure may be measured thereby.

Controller 114 monitors the operation of the gauges 108*a,b*, (and optionally others in certain embodiments) and current source 116, and is operable to determine when one or more of the gauges has ceased to provide measurement data back to the controller, by way of data line 120 for instance, for display on user interface 122. When such a fault condition attributable to one or more of the gauges 108*a,b* occurs, controller 114 may be configured to initiate corrective action, such as delivering a control signal to current source 116 to change, and nominally increase, the amount of current supplied to one or more of the gauges 108*a,b* of sensor 106*a* via cable 118. In this manner an unplanned cessation of the receipt of measurement data from one or more gauges 108*a,b* of sensor 106*a* will initiate a correction regime that entails increasing or decreasing the current supplied to the subject gauge.

Figure 3:
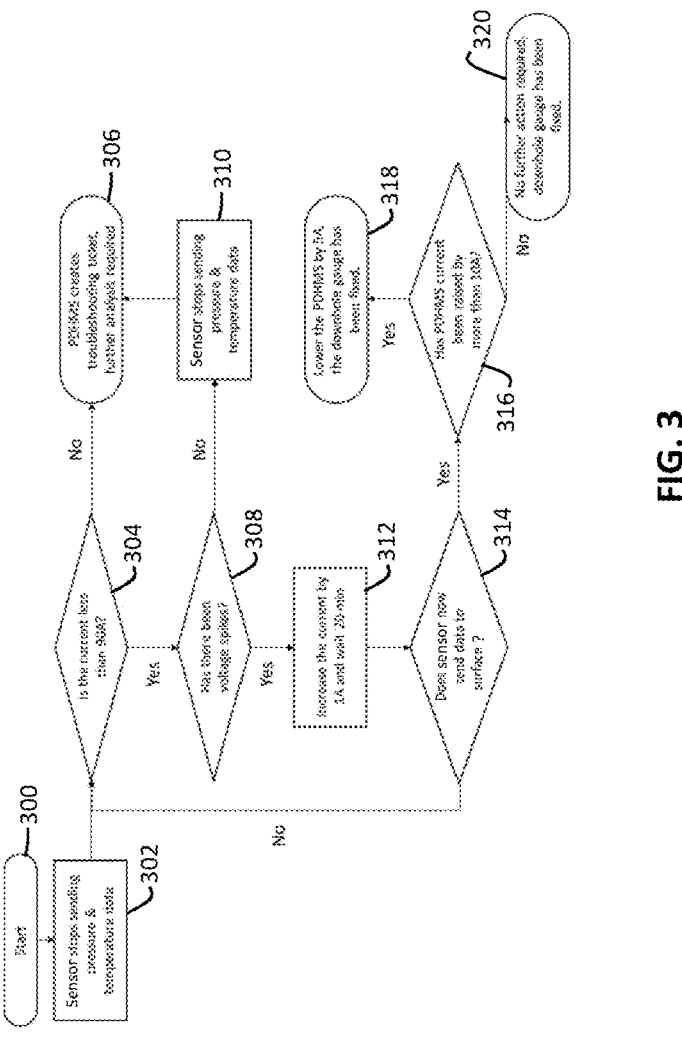
FIG. 3 is a flow diagram showing operation of a PDHMS in accordance with certain embodiments.

Operation of PDHMS 106 may further be described with reference to the flow diagram of FIG. 3. The process begins at step 300. At step 302, a fault condition occurs, with the sensor 106*a* ceasing to send temperature and/or pressure data from either or both gauges 108*a,b*. At 304, controller 114 determines whether current supplied to sensor 106*a* by current source 116 is below a predetermined threshold value, for example 90 amps. If the supplied current is not below the threshold value, then at 306, a fault condition is indicated by fault indicator 124, for example by creating a troubleshooting ticket indicating that further servicing of PDHMS 106 may be necessary.

If the current is below the threshold value (of 90 amps for example), then at 308 it is determined whether a voltage spike has occurred. If a voltage spike has not occurred, and the sensor has stopped sending pressure and/or temperature data at 310, then the process proceeds to the fault condition indication at 306. It should be noted that in offshore oilfield conditions, electricity may be inconsistent and the quality of the electricity can be choppy, unlike in residential or commercial settings, wherein electric companies ensure that the quality of electricity is up to a certain standard. Some causes of inconsistency may be a lightning strike increasing voltage, operators pouring too much diesel in a combustion engine causing the pistons to revolve more than designed, or other equipment within the same platform drawing too much power, reducing the available electricity in the network. All of these examples illustrate how voltage can be dropped or increased at the PDHMS 106, and when they or similar events occur, the PDHMS gauges may stop sending data and remedial actions may be needed.

If, at 308, a voltage spike is determined to have occurred (and the current is less than the threshold value), then at 312 controller 114 instructs the current source 116 to incrementally increase the current supplied to one or more of the gauges 108*a,b* of sensor 106*a*, for example by an incremental value of 1 amp. The increase increments, as well as the threshold value and other operational parameters of PDHMS 106, may be user-selectable and may be entered by an operator by way of a user interface 122 (FIG. 2) of the field control unit 106*b*.

At 314, following an incremental increase of current, controller 114 determines if the sensor 106*a* has resumed sending data from the gauges 108*a,b*. If data transmission has not resumed after a user-selectable delay, for example of 20 minutes, then the process loops back to step 304.

If data transmission has resumed after the incremental current increase, then at 316 controller 114 determines if the current supplied by the current source 116 has been raised more than a user-selectable maximum value, for example 10 amps. If the current supplied by the current source 116 has been raised more than the maximum value, then at 318 the controller instructs the current source 116 to reduce the current by a user-selectable reduction value, for example 5 amps, and the fault condition will be deemed corrected. If the current supplied by the current source 116 has not been raised more than the maximum value, then at 320 the fault condition will be deemed corrected and no further action will be required.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A permanent downhole measuring system (PDHMS) comprising:
a sensor having one or more gauges each operable to provide measurement data indicative of a physical parameter; and
a field control unit operable to receive the measurement data from the one or more gauges, the field control unit including a current source configured to provide, during a sensing operation, current to at least one gauge of the sensor by way of a dedicated communication channel between the field control unit and the sensor, and to apply a correction regime, by way of the dedicated communication channel, that changes the amount of current provided to the at least one gauge upon unplanned cessation of the receipt of the measurement data from the at least one gauge.

2. The PDHMS of claim 1, wherein the correction regime comprises incrementally increasing current from the current source, in response to the current being below a threshold value, until the field control unit receives measurement data from the at least one gauge.

3. The PDHMS of claim 2, wherein the field control unit includes a user interface configured to receive the threshold value and an increment value from an operator.

4. The PDHMS of claim 1, wherein the measurement data includes pressure and/or temperature data.

5. The PDHMS of claim 1, further including a controller for instructing the current source to operate in accordance with the correction regime.

6. The PDHMS of claim 1, wherein the field control unit further includes a fault indicator for providing an indication of a fault condition.

7. The PDHMS of claim 1, wherein the PDHMS is communicatively coupled to a central control unit by way of a network.

8. A method for operating a PDHMS comprising:
supplying, using a dedicated communication channel, current from a current source disposed in a field control unit to a gauge of a sensor deployed in a wellbore;
receiving at the field control unit measurement data from the gauge indicative of a physical parameter in the wellbore;
detecting an unplanned cessation of receipt of measurement data from the gauge; and applying, by way of the dedicated communication channel, a correction regime to the gauge upon detecting said unplanned cessation, the correction regime including:
in response to the current being below a threshold, incrementally increasing the current,
in response to the current being increased by more than a maximum value, and to the resumption of receipt of the measurement data, reducing the current by a reduction value.

9. The method of claim 8, wherein one or both the threshold value and maximum value are user-selectable.

10. The method of claim 8, further comprising generating a fault condition indication in response to the current being above the threshold.

11. The method of claim 8, further comprising generating a fault condition indication in response to the current being below the threshold, a voltage spike not having occurred, and unplanned cessation having occurred.

12. A non-transitory machine-readable storage medium having stored thereon a program for operating a PDHMS, the program comprising a routine of set instructions for causing the machine to perform the steps of:
supplying current from a current source disposed in a field control unit to a gauge of a sensor deployed in a wellbore;
receiving at the field control unit measurement data from the gauge indicative of a physical parameter in the wellbore;
detecting an unplanned cessation of receipt of measurement data from the gauge; and
applying a correction regime to the current source upon detecting said unplanned cessation, the correction regime including:
in response to the current being below a threshold, incrementally increasing the current,
in response to the current having been increased by more than a maximum value, and receipt of the measurement data having resumed, reducing the current by a reduction value.

13. The machine-readable storage medium of claim 12, wherein one or both the threshold value, and maximum value are user-selectable.

14. The method of claim 12, the set of instructions further causing the machine to perform the step of:
generating a fault condition indication in response to the current being above the threshold.

15. The method of claim 12, the set of instructions further causing the machine to perform the step of:
generating a fault condition indication in response to the current being below the threshold, a voltage spike not having occurred, and unplanned cessation having occurred.

* * * * *